July 6, 1943.    C. R. TAYLOR    2,323,757
APPARATUS FOR AND PROCESS OF HANDLING HOLLOW ARTICLES
Filed Aug. 21, 1939    2 Sheets-Sheet 1

INVENTOR
Carl R. Taylor
BY Evans + McCoy
ATTORNEYS

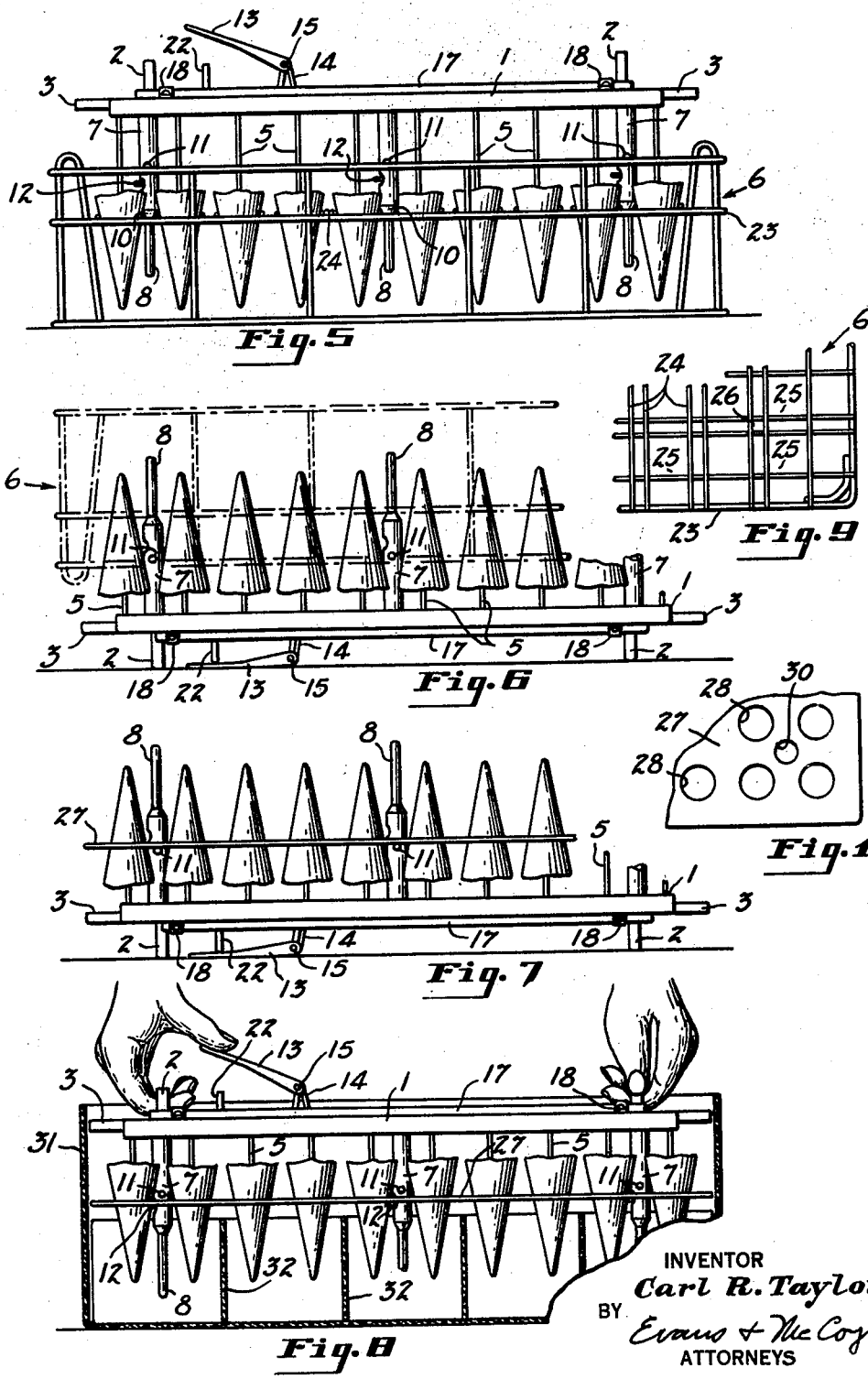

Patented July 6, 1943

2,323,757

UNITED STATES PATENT OFFICE 2,323,757

APPARATUS FOR AND PROCESS OF HANDLING HOLLOW ARTICLES

Carl R. Taylor, Cleveland Heights, Ohio, assignor to The Cream Cone Machine Company, Cleveland, Ohio, a corporation of Ohio Application August 21, 1939, Serial No. 291,129

6 Claims. (Cl. 226—14)

This invention relates to a handling device and to a process of handling hollow articles and the like, such as, for example, ice cream cones and other similarly shaped confections.

It is very desirable, and in some locations required, that food products should not be touched during the fabrication and packaging thereof. It is, therefore, an object of the present invention to provide a device for and a process of handling hollow conical articles and the like without the necessity of manually contacting the articles during such handling.

Another object is to provide a process of handling ice cream cones and the like by which a plurality of the cones may be handled simultaneously thereby affording greating savings in time to pack and unpack the cones.

Another object is to provide a handling device which may be used to handle a plurality of cones simultaneously which device will be simple in design and construction and relatively inexpensive to fabricate.

Other objects and advantages of the present invention will become apparent from the following detailed description accompanied by the drawings in which like parts throughout the several views are indicated by the same reference numerals.

In the drawings,

Fig. 5 is an elevational view showing the handling device and how it may be used in the packing of ice cream cones for shipment;

Fig. 6 is an elevational view similar to Fig. 5 showing how the handling device is inverted during the process of packing cones;

Fig. 7 is an elevational view similar to Fig. 6 illustrating another step in the process of packing cones;

Fig. 8 is an elevational view illustrating the hands of the operator and how he may deposit a plurality of cones into the packing container;

Fig. 9 is a fragmentary plan view of a portion of the cone-holding basket shown also in Figs. 5 and 6; and Fig. 10 is a fragmentary plan view of the cone holder, shown also in Figs. 7 and 8, and utilized to support the cones during shipment in the packing container.

Although the present description of the invention is concerned primarily with the handling of ice cream cones, it is to be noted that the features of the present invention may be applied to the handling of any other similarly shaped articles.

Briefly, the process of the present invention comprises collecting a plurality of cones simultaneously onto a handling device from a cone-holding member and replacing the cone-holding member with the desired cone-holding member in accordance with the location for which the cones are destined. In other words, if the cones are to be packed, the cone-holding device is employed to collect the cones from the standard baskets or trays in which the cones are placed after fabrication, to support the cones during replacement of the basket or tray by a suitable member adapted to hold the cones during shipment and to deposit the cones and cone-holding member into a suitable packing container. In unpacking the cones the process is just the reverse. That is, the cone-holding device is used to remove the cones and cone-holding member from the packing container and to support the cones during replacement of the cone-holding member by the standard tray or basket.

Figure 1:
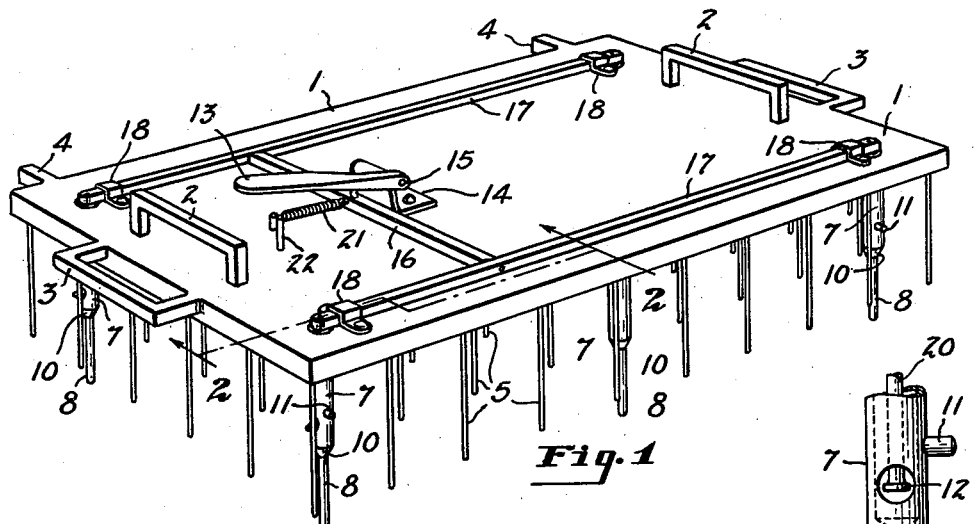
Figure 1 is a view in perspective of a preferred form of handling device embodying the present invention.
Figure 4:
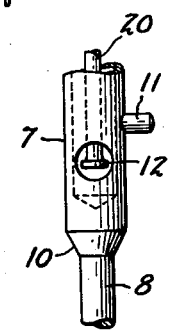
Fig. 4 is a fragmentary view illustrating details of a portion of the handling device shown in Fig. 1.

Fig. 1 shows the cone-holding device and it may be seen that it comprises a body or plate 1 having suitable handles 2 projecting from the top surface thereof, preferably disposed inwardly of the edges. Another set of handles 3 extend outwardly from the ends of the body 1. As well as serving as a means by which the handling device may be lifted, the handles 3 are arranged to afford a gaging means for the handling device when it is inserted into the packing container so that the cones carried by the handling device may be properly positioned in the packing container. To assist in the positioning of the handling device, one or more lugs 4 extend from one side of the body 1, as shown in Fig. 1.

Figure 2:
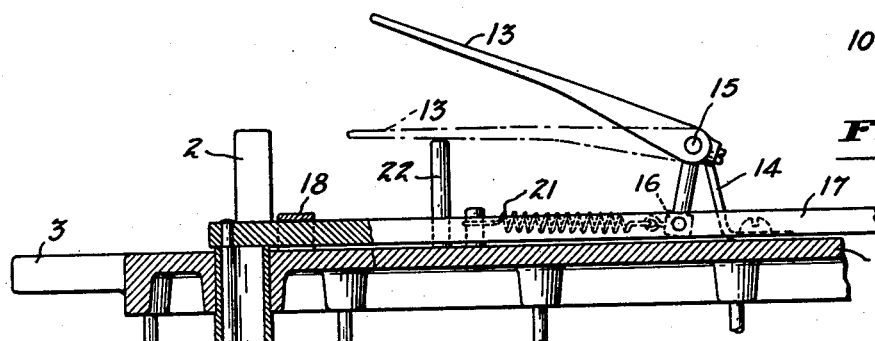
Fig. 2 is an elevational sectional view illustrating details of the device shown in Fig. 1.

Depending from the under side of the body 1 are a plurality of elongated supports or pins 5 which are sufficiently long to freely support cones thereon when the handling device is inverted. The pins 5 are disposed in parallel relation to one another in rows and spaced to conform with the location of cones in a carrying tray or basket 6, such as that shown in Figs. 5, 6 and 9. Also projecting from the under side of body 1 is a plurality of guide posts 7. The guide posts 7 are hollow and open to the top surface of the body 1. In the handling device shown in Fig. 1 six guide posts are used, being disposed one in each corner and two intermediate the ends of the handling device along each side thereof. Each of the guide posts 7 is provided near its unattached end with a reduced end portion 8, which portion 8 is connected to the guide post proper by a tapered shoulder portion 10. When the reduced portions 8 of the guide posts are inserted into the spaces of the tray or basket 6 between the cone supporting sockets thereof, the tapered portions 10 serve as a stop means so that the handling device will be supported upon the tray by such tapered portions. Between the tapered portions 10 and the underneath of the body 1 each of the guide posts is provided in the order named with a fixed stop 11 and a retractable stop 12, for a purpose to be disclosed later. When the handling device is in its normal position, the movable stop 12 is disposed below the fixed stop 11 and may be controlled from the top of the handling device by the lever or handle 13. The handle 13 is pivoted to a bracket 14 at 15, and the bracket 14 is firmly secured to the top surface of the body 1. On one side of the pivot point 15, the handle 13 is connected to a transverse rod 16, the ends of which are connected to longitudinally extending rods 17. The rods 16 and 17 are adapted to slide along the top surface of the body 1, the rods 17 being held in place by clips 18 which are secured to the body 1. The rods 17 are disposed directly over the guide posts 7 and are connected to stems 20 which stems are disposed in the hollow guide posts 7. The ends of the stems 20 are bent so that they may be projected through apertures in the walls of the guide posts to form the movable stops 12. A coil spring 21 is connected at one end to the transverse rod 16 and at its other end to the top of the body 1. The purpose of spring 21 is to maintain the movable stop 12 in its projected position, at which time the handle 13 is in its uppermost position as shown in full lines in Fig. 2.

Figure 3:
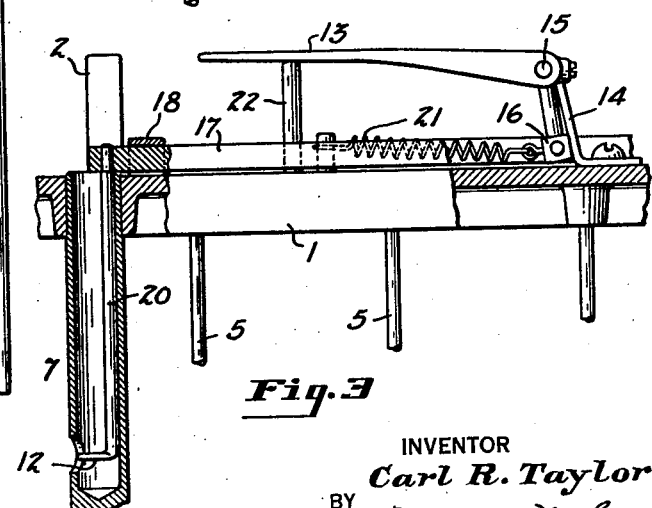
Fig. 3 is a sectional view similar to Fig. 2 showing how the device in Fig. 1 may be operated.

To limit the movement of the handle 13 and also to provide a support therefor when the handling device is in its inverted position and resting on a flat surface, the post 22 is mounted on the top surface of the body 1 and its height is such that when the handle 13 is in contact therewith a combined height of the post and handle above the surface of the body 1 is equal to or slightly less than the height of the handles 2. To cause the movable stops 12 to move to their retracted position shown in Fig. 3, the handle 13 is depressed against the tension of the spring 21 until it contacts post 22.

The tray or basket 6 might be termed standard equipment, as it is used rather widely in the cone-making industry and comprises an outer framework 23 provided with a network of crossed wires 24 to form ten rows of six sockets 25, each sufficiently small to support a cone therein. Two of the wires 24 are disposed between adjacent sockets 25 so that at the corners of the sockets the wires 24 form rectangular openings 26, in which the reduced portion 8 of the guide posts 7 may be received.

The holding member which is used to hold the cones in the packing container may comprise a cardboard sheet 27 (Figs. 7, 8 and 10), having cone-receiving apertures 28 formed therein. The apertures 28 are spaced so that they register with the sockets 25 of the basket 6 if superposed thereover. The holding member 27 is also provided with apertures 30 of sufficient size to embrace the portion of the guide post 7 between the fixed and retractable stops 11 and 12 respectively. If the cardboard sheet were superposed over the basket 6 with the apertures 28 in register with the sockets 25, the apertures 30 would be concentric with the openings 26 in the basket.

When the cones have been fabricated they are placed in sockets 25 of a basket or tray 6, and when it is desired to pack the cones for shipment to another location for filling, the handling device of the present invention may be advantageously used for packing and unpacking the cones without their being touched by human hands.

In packing the cones the handling device is disposed over a basket full of cones and the reduced portions 8 of the guide posts are inserted into the openings 26, substantially as shown in Fig. 5, with one of the pins 5 disposed in each of the cones. The handling device is supported on the basket by the tapered portions 10 of guide posts 7 resting on the wires 24 defining the openings 26. The handling device and the basket 6 are held in their assembled position and inverted so that the handling device rests on its handles 2. This is the position shown in Fig. 6 and it may be seen that the basket 6, shown in dotted lines, may be readily removed, leaving the cones resting on the ends of the pins 5. The cone-holding member 27 may be positioned above the handling device and slid over the cones and guide posts until it contacts the fixed stops 11, as shown in Fig. 7. When the handling device is lifted from the surface upon which it was resting, the spring 21 pulling on the transverse rod 16 pivots the handle 13 to its top position, causing the stops 12 to be projected. Then the handling device may be reinverted and the cone-holding member 27 will be supported on the movable stops 12 and the cones will be supported by the holding member 27. Next the handling device is carried to a packing container 31 (Fig. 8) and by using the handles 3 and lugs 4 to position the handling device with respect to the container it may be readily inserted into the container. By depressing the handle 13 the operator may release the cone-holding member 27 so that it may rest on a checkerboard support 32 disposed at the bottom of the container 31.

Subsequent layers of cones may be deposited in the packing container so that they will nest with the first layer of cones deposited therein. If desired, suitable spacers may be used to separate adjacent cone-holding member 27 in the shipping container so that there will be no contact between adjacent layers of cones. In this manner each layer of cones is supported by its cone-holding member out of contact with other cones and the danger of damage to the cones due to impact in the container is obviated.

At the location where the cones are to be removed for use, the handling device may be inserted into the packing container with the movable stop 12 in its retracted position, and when the stop 12 is beneath the cone-holding member it may be projected so that it will support the cone-holding member as the handling device is raised. Then the handling device may be inverted and rested on its handles 2, as shown in Fig. 7. Resting on the handles 2 causes the movable stop 12 to be retracted so that the member 27 may be readily removed and replaced by a basket holding member. By simultaneously inverting the basket and handling device and removing the handling device, the cones are all disposed in the sockets of the basket, ready to be processed or filled.

Thus it may be seen that by the present invention hollow articles, and particularly ice cream cones, may be handled and packed or unpacked without their being touched by human hands. Furthermore, articles handled according to the present invention will not be subjected to any strain during the handling process, so that breakage during processing is minimized.

It is to be understood that variations and modifications of the specific devices and the particular steps of the process herein shown and described for purposes of illustration and explanation may be made without departing from the spirit of the invention.

What I claim is:

1. A handling device for hollow articles such as ice cream cones and the like which comprises a body portion, a plurality of pins depending therefrom upon which articles may only be supported when the device is inverted, means for interfitting the device with a basketlike, socketed, holding member adapted to hold a plurality of articles in spaced relationship, a fixed stop for supporting a sheetlike article spacing and holding member when the device is inverted, a movable stop for supporting the sheetlike member when the device is upright, means for retracting the movable stop to a non-supporting position, said last means including a lever operable from the top of said body portion.

2. A handling device for hollow articles such as ice cream cones and the like, which comprises a body portion having at least one handle member, a plurality of elements extending partially within the hollow articles for supporting the articles only when the device is inverted, means for interfitting the device with an article-holding member adapted to hold a plurality of articles out of contact with each other, and means for supporting the article-holding member when the device is inverted and when it is upright, at least one of said last mentioned means being retractible to a non-supporting position.

3. A handling device for hollow articles such as ice cream cones and the like, which comprises a body portion, handle members constructed to support the device in an inverted position, a plurality of pins depending from the device which may support articles when the device is inverted, guide means to permit interfitting of the device with an article-holding member, a retractible support for supporting article-holding members when the device is upright, means for retracting the support, said last mentioned means engaging a supporting surface to cause retraction of said retractible support when the device is inverted and the handle members and said last mentioned means engage a supporting surface.

4. A handling device for hollow articles such as ice cream cones and the like, which comprises a body portion, a plurality of pins depending from said body portion and adapted to support articles when the device is inverted, guide means to permit interfitting of the device with an article-holding member, support means carried by said device to support the article holding member when the device is in an inverted position and in an upright position, the supporting planes of said support means being spaced vertically to one side of the plane of support on said pins whereby articles held by the holding member will drop onto the pins when the device is inverted.

5. A handling device for hollow open ended articles such as confection cones which comprises a body, a plurality of generally parallel elongated article supports extending from one side of the body in spaced relation to one another, elongated hollow members extending from said side of the body substantially in parallelism with the supports to serve as guides when interfitting the device with an article holding member, movable stops extending through the walls of the hollow members for engaging and retaining the article holding member and mechanism carried by the body and having connections with the stops to simultaneously retract all the stops within the hollow members to thereby release the article holding member.

6. The art of handling hollow open ended fragile articles such as confection cones to transfer the same from one device to another comprising supporting a plurality of the articles in spaced relation to one another and with their open ends uppermost, simultaneously inverting all the articles while holding the same in predetermined relative spaced positions by internal and external engagement thereof, individually supporting the inverted articles in spaced relation by internal engagement of the same, simultaneously righting all the articles while holding the same in predetermined relative spaced positions by internal and external engagement thereof, and individually supporting the righted articles in spaced relation by external engagement of the same.

CARL R. TAYLOR.